United States Patent Office 3,328,121
Patented June 27, 1967

3,328,121
GYPSUM PRODUCT
John D. Shull, Jr., Tonawanda, N.Y., assignor to National Gypsum Company, Buffalo, N.Y., a corporation of Delaware
No Drawing. Filed Dec. 30, 1963, Ser. No. 334,622
2 Claims. (Cl. 23—122)

The present invention relates to an improved gypsum product, its method of manufacture, and to an improved finish coat utilizing said improved gypsum product as a component thereof.

The use of the hemihydrate of gypsum, $CaSO_4 \cdot \frac{1}{2}H_2O$ having a particle size of 2,000–5,000 square centimeters per gram as gauging plaster is well known in the art. The above described gauging plaster is mixed with water and lime, $Ca(OH)_2$ and $Mg(OH)_2$, on the job to provide a finish coat composition. In the foregoing composition, the gypsum gives a hard finish and prevents shrinkage of the lime constituents while they dry. The lime constituents, in turn, impart workability and plasticity to the mixture. Gauging plaster by itself does not have sufficient water retention to allow it to be troweled on a wall, that is, it has poor working characteristics relative to troweling because the water which is in the mixture gets sucked into the base and cannot act as a lubricant for the trowel. Thus, in the above mixture the more gauging plaster which is used, the poorer will be the workability of the mixture. It has been found that different limes have different workability because of various factors, including the method of preparation, the original quality of the limestone, the impurities therein, the crystal structure, and the like. The gauging plaster itself cannot compensate for any of the variations in workability of the original lime but is merely utilized for gauging, as noted above. In the foregoing mixture the higher the gypsum content, the less will be the water retention and the more difficult will it be to apply the mixture. On the other hand, the less the gypsum content of the mixture, the more will be the possibility of shrinkage and the softer will be the wall. Thus, in the past a proper proportioning of a gauging plaster with lime was required to achieve the desired balance between workability and hardness of the finished wall, and this proportioning was rather critical. It was almost impossible to get a mixture which gave good workability and high hardness.

In the past, tube mill stucco has also been utilized for various purposes. Tube mill stucco is calcined gypsum, that is, hemihydrate of gypsum which has been passed through a tube mill and has a particle size of 9,000–15,000 square centimeters per gram. Tube mill stucco has been used generally for a base coat with an aggregate therein, such as sand. It is satisfactory as a base coat because it does not have to be smooth and the aggregate makes it work relatively easily. However, it is not practical to use this tube mill stucco by itself as a finish coat because some particles are compressed into flakes which are hard and do not break down in water, that is, they will not absorb water and therefore will not disintegrate. The flakes will cause the surface to be scratched during troweling. In addition, tube mill stucco is sticky and sticks to the trowel and other plastering tools when used without an aggregate. Furthermore, because of its fineness, tube mill stucco will not soak and therefore will not give a good mix when used as a gauging plaster with lime. The failure to soak is believed to be due to the fact that its particle size is so small that it will not absorb water. In addition, as noted above, the flakes will not break down and therefore will cause the finish coat to scratch. Thus there have been the above enumerated disadvantages which have rendered tube mill stucco undesirable either for use as a gauging plaster or for use by itself.

It is accordingly one object of the present invention to provide an improved gypsum product which may be utilized as either a gauging plaster with lime or by itself as a 100% gypsum smooth finish, and which is not subject to the above enumerated disadvantages in either case.

Another object of the present invention is to provide a method for the manufacture of the above noted improved gypsum product having improved water retention and working properties.

A further object of the present invention is to provide an improved gypsum-lime composition which has improved water retention, improved workability, and which can include a relatively high proportion of gypsum to provide a hard finish coat. Other objects and advantages of the present invention will readily be perceived hereafter.

Briefly, the improved product of the present invention is hemihydrate of gypsum which has been obtained by regrinding tube mill stucco of a surface area of between 9,000 and 15,000 square centimeters per gram in an impact mill to provide a product with surface area which has been increased between 100 to 4,000 sq. cm./gm. over the tube mill stucco from which it was made.

The improved method of manufacture of the above product consists of performing the heretofore conventional steps of manufacturing tube mill stucco, as described in detail hereafter, and thereafter further reducing the size of the tube mill stucco (hemihydrate of gypsum having a surface area of 9,000–15,000 square centimeters per gram) to a range of between 9,100 and 19,000 square centimeters per gram, preferably by use of an impact mill.

The improved gypsum-lime composition of the present invention includes the above-mentioned hemihydrate of gypsum with a surface area of between 9,100 and 19,000 square centimeters per gram in addition to calcium and magnesium hydroxides. The various aspects of the present invention will be more fully understood hereafter.

Briefly, by way of background, the conventional steps of preparing hemihydrate of gypsum after it is mined is to run the gypsum through roll or jaw crushers to provide primary and secondary crushings. Thereafter, the product is dried in rotary driers to drive off the free water. This product is thereafter subjected to the action of a hammer mill with a coarse screen to give gypsum particles $\frac{3}{8}''$ size and down, which are thereafter subjected to a roll grinding action which causes 80% to 98% of the resulting product to pass through a 100 mesh screen. This gypsum is then calcinated to convert the gypsum dihydrate, $CaSO_4 \cdot 2H_2O$, to calcium hemihydrate, $CaSO_4 \cdot \frac{1}{2}H_2O$. The gypsum leaves the calcining process at a temperature of 350° F., as is well known in the art. The resulting product is subjected to an air separation action to remove the fine particles and is also subjected to the action of a scalping screen to take out the coarse particles to thereby cause the particles which remain to be within the range of 2,000 to 5,000 square centimeters per gram to produce gauging plaster. The hemihydrate of gypsum directly from the calciner (no air separation or scalping) is subjected to a tube mill action to provide tube mill stucco having a surface area of 9,000–15,000 square centimeters per gram.

As noted above, the hemihydrate of gypsum having a particle size of between 2,000 and 5,000 square centimeters per gram, is utilized as a gauging plaster which is mixed with lime consisting of calcium hydroxide and magnesium hydroxide and water on the job for finish coats. The reason that the air separation was utilized, as noted above, was to remove the fine particles because they will not soak during the mixing with lime for the finish coat. Furthermore the reason that the coarse particles were separated by scalping was because they will scratch during troweling. It is the hemihydrate of gypsum which gives a hard finish to the finish coat and also prevents shrinkage of the lime constituents while they dry. Inasmuch as the gauging plaster by itself does not have sufficient water retention to allow it to be troweled on a wall, the more that is used in the finish coat mixture with the lime, the poorer will be the workability of the resulting composition. Furthermore, since various limes work differently depending on their characteristics, and since it is the limes which provide the plasticity to the finish coat mixture, it is always difficult to know in which proportions the gypsum and the lime should be mixed in order to obtain optimum characteristics of hardness and plasticity. At this point it is to be again noted that the gauging plaster used in the past could not compensate for the variations in workability of the lime, but it was necessary for the gauging, to prevent shrinkage of the lime while it dried, and also to provide the desired hard finish.

The above mentioned tube mill stucco which has a surface area of 9,000 to 15,000 square centimeters per gram cannot be used as a gauging plaster with lime because it will not soak and therefore will not give a good mix. In addition, because the tube mill stucco contains some compressed flakes, there will be scratching of the finish coat.

It is also to be noted that the tube mill stucco cannot be used by itself as a finish coat because it has the same disadvantages when used by itself as when it is used as a gauging plaster with lime in addition to being extremely sticky if no aggregate is used.

In accordance with the present invention the tube mill stucco, that is, gypsum hemihydrate having a surface area of 9,000–15,000 square centimeters per gram is subjected to an impact milling operation, the results of which have proven quite unexpected and contrary to what would have been expected from a normal extension of the prior teachings. The impact milling of the present invention consists of subjecting the tube mill stucco to collision with a relative high velocity solid hammerlike means and has been performed satisfactorily on a model or size 51 "Imp" mill manufactured by Combustion Engineering Inc., Raymond Division. By subjecting the tube mill stucco to the foregoing action, a reground tube mill stucco of a surface area of between 100–4,000 square centimeters per gram more than the tube mill stucco from which it was manufactured, as determined by the "air permeability method," has been obtained. These particles have been successfully obtained by pressure feeding the tube mill stucco through the above mentioned impact mill which directs it through the rotating path of a plurality of hammers which are rotating at a peripheral speed on the order of 20,000 feet per minute. The gypsum upon passing through the pathway of the hammers and being subjected thereby to an indeterminate number of collisions, is ejected from the impact mill. While the above described gypsum product has been successfully obtained with the above mentioned apparatus, it is believed that it may also be obtained by other grinding or milling operations.

The above described impact milled hemihydrate of gypsum having a particle size of between 9,100 and 19,000 square centimeters per gram has unexpectedly provided properties which are directly contrary to what would have been expected in either the use of this gypsum as a 100% finish by itself or as a gauging plaster when mixed with lime.

More specifically, relative to using the above mentioned product by itself as a 100% smooth gypsum finish, it is to be noted that the stickiness of tube mill stucco has been entirely obviated. It is believed that this is the case because of a different particle shape which is obtained from impact milling. At this point it is to be noted that it would normally have been expected that the smaller particle size would have given more stickiness rather than less thickness. It is also noted that the tube mill stucco is more plastic than the product of the present invention as measured by the Emley plasticimeter. In this respect, tube mill stucco has a plasticity of between 450 and 500 on the Emley scale whereas the product of the instant invention has a plasticity of between 300 and 400. However, it is good for commercial purposes to have less plasticity in this high range of plasticity in working the material to eliminate stickiness. In addition, it would normally have been expected that the finer particles of the present invention would provide more difficulty in soaking than tube mill stucco. However, this has not been found to be the case even though the particles are finer, as determined by the above air permeability measurement. The finer particles will soak better than the tube mill stucco and therefore give a good mix, contrary to what would normally have been expected. In addition, the impact milling breaks up the flakes which cause the scratching and therefore there is no scratching experienced when the gypsum is used as a 100% wall finish. Thus, the last step of the instant process, namely, the impact milling to reduce the particle size has caused the resulting product to be entirely free of the disadvantages of tube mill stucco and to be manifestly capable of utilization as a 100% final coating.

In addition, the instant gypsum product having a size of between 9,100 and 19,000 square centimeters per gram provides unexpected results when utilized as a gauging plaster with lime consisting of calcium hydroxide and magnesium hydroxide, said lime having a particle size of between 18,000 and 25,000 square centimeters per gram. More specifically, contrary to what would normally have been expected, when the instant product is mixed with lime and water, the resulting mixture has infinitely better water retention than if the same proportions of gauging plaster were used with the lime. This water retention thus enhances the ease of application of the product and thus makes it more workable. Another unexpected result is that the product of the present invention, namely, the gypsum with a particle size of 9,100 to 19,000 square centimeters per gram has a plasticity of between 300 and 400 as measured by the Emley plasticimeter test. The plasticity of gauging plaster having a size of between 2,000 and 5,000 square centimeters per gram is approximately 100 on the Emley scale. The plasticity of the lime is only between 200 and 300, as measured on the Emley plasticimeter. Thus the product of the instant invention itself is more plastic than the product which was heretofore utilized as a plasticizer, namely, the lime. This makes the resulting product more workable than previous compositions utilizing the same proportions of gauging plaster and lime. Because of the increased plasticity, the working properties of the finish coat consisting of gypsum and lime are greatly enhanced with the increase of the hemihydrate of gypsum, contrary to what was experienced in the past with larger sized particles of between 2,000 and 5,000 square centimeters per gram. Because the working properties do increase, the variations in workability of the original lime which are dependent on its grade, quality, and size are not as dominant and therefore not as critical in the mixture. In addition, by the use of the instant gypsum product it is now possible to provide a finish coat which both increases in workability and hardness of finish with increases in proportions of gypsum, whereas in the past an increase in gypsum would have decreased the working properties. In short, by reducing the size of the tube milled hemihydrate of gypsum to a value of between 9,100 and 19,000 square centimeters per gram by a remilling action, the disadvantages of gauging plaster, as heretofore known, have been entirely obviated.

In the foregoing respect it is to be noted that previous standards for commercial mixtures of lime and gypsum required that there be no more than two parts of dry lime to one part of gypsum by weight. This was necessary in order to cause the resulting finish coats to be sufficiently hard. With the present gypsum product, successful mixtures of between 30% gypsum and 70% lime to 50% gypsum and 50% lime have been commercially produced and have been found to be extremely satisfactory in view of the above enumerated characteristics.

In addition it has been found that the instant impact milled hemihydrate of gypsum having a surface area of between 9,100 and 19,000 square centimeters per gram can be very successfully used as a component of premixed lime finish coat with lime having a surface area of between 18,000 and 25,000 square centimeters per gram and consisting of calcium and magnesium hydroxides.

It is to be noted that when the improved product of the present invention is used as a finish coat, a set control additive of any conventional type is added thereto for the purpose of increasing its setting time.

In summary, it can readily be seen that by the use of the present invention an improved gypsum product has been obtained by a new method, and both the product and the results which are obtainable by the use thereof under various circumstances are entirely unexpected because it would normally have been expected that the decreasing of the particle size of the hemihydrate of gypsum would have caused the disadvantages of this product, as used in all of the foregoing respects, to be greatly magnified rather than greatly reduced.

I claim:

1. A gypsum plaster capable when mixed with water of providing improved soakability and workability comprising tube milled gypsum hemihydrate having a surface area of at least 9,000 square centimeters per gram which has subsequently been impact milled to provide an increase in surface area of at least 100 square centimeters per gram.

2. A gypsum plaster as set forth in claim 1 wherein the tube milled gypsum hemihydrate has a surface area of between about 9,000 and 15,000 square centimeters per gram and wherein the tube milled-impact milled gypsum hemihydrate has a surface area of between about 9,100 and 19,000 square centimeters per gram, provided that on impact milling of the tube milled gypsum hemihydrate there is an increase in surface area of at least 100 square centimeters per gram.

References Cited
UNITED STATES PATENTS

| | | | |
|---|---|---|---|
| 1,470,731 | 10/1923 | Hartner | 106—109 |
| 1,897,956 | 2/1933 | Offutt | 106—110 |
| 1,967,959 | 7/1934 | McAnally | 106—110 |
| 1,999,158 | 4/1935 | Roos | 106—110 |
| 2,341,426 | 2/1944 | Dailey | 106—110 |
| 2,868,660 | 1/1959 | Lemmon | 106—109 |
| 2,913,308 | 11/1959 | Dailey et al. | 23—122 |
| 2,947,643 | 8/1960 | Kamlet | 106—109 |
| 2,956,867 | 10/1960 | Volk et al. | 106—118 |
| 2,957,776 | 10/1960 | Volk | 106—118 |
| 2,980,548 | 4/1961 | Hampton | 106—118 |
| 3,147,129 | 9/1964 | Armstrong et al. | 106—109 |

HELEN M. McCARTHY, *Primary Examiner.*

TOBIAS E. LEVOW, *Examiner.*

S. E. MOTT, *Assistant Examiner.*